United States Patent [19]

Bruene

[11] Patent Number: 4,516,087
[45] Date of Patent: May 7, 1985

[54] METHOD FOR REDUCING SIDE-LOBE ENERGY IN AN MSK DETECTABLE SIGNAL

[75] Inventor: Warren B. Bruene, Dallas, Tex.
[73] Assignee: Rockwell International Corporation, El Segundo, Calif.
[21] Appl. No.: 367,705
[22] Filed: Apr. 12, 1982
[51] Int. Cl.$^3$ .............................................. H03C 3/00
[52] U.S. Cl. .................................. 332/17; 332/23 A; 375/42; 375/47
[58] Field of Search .............. 332/17, 18, 23 A, 23 R; 375/42, 47, 51, 60, 64

[56] References Cited

U.S. PATENT DOCUMENTS 4,135,057  1/1979  Bayless, Sr. et al. ................. 375/53

OTHER PUBLICATIONS

DeJager, F., "Tamed Frequency Modulation, A Novel Method To Achieve Spectrum Economy In Digital Transmission", IEEE Transactions on Communications, v. COM-26, No. 5, pp. 534–542, May 1978.
Asakawa, S. et al, "A Compact Spectrum Constant Envelope Digital Phase Modulation", IEEE Transactions On Vehicular Technology, v. VT-30, No. 3, pp. 102–111, Aug. 1981.
Nakajima, S. et al, "Gaussian Filtered and Amplitude Limited MSK", Transactions of the IECE of Japan, v. E-64, No. 11, pp. 716–723, Nov. 1981.

Primary Examiner—Eugene R. LaRoche
Assistant Examiner—Robert J. Pascal
Attorney, Agent, or Firm—Richard A. Bachand; V. Lawrence Sewell; H. Fredrick Hamann

[57] ABSTRACT

A method and apparatus for generating an MSK detectable signal with reduced side lobe energy of the type in which the MSK detectable signal has two combined orthogonal channels to transmit a data signal. A predetermined channel envelope modulation waveform pattern is selected in accordance with a group of data bits, and the respective orthogonal channels are amplitude modulated with the selected predetermined waveforms. The addition of the orthogonal channels results in a constant amplitude signal with greatly reduced energy in the higher order sidelobes.

3 Claims, 10 Drawing Figures

METHOD FOR REDUCING SIDE-LOBE ENERGY IN AN MSK DETECTABLE SIGNAL

BACKGROUND OF THE INVENTION

1. Field of the Invention

This invention relates to improvements in MSK modulation techniques, and more particularly to a method for generating an MSK detectable signal having reduced side-lobe energy.

2. Description of the Prior Art

Minimum shift keying (MSK) modulation has become of increasing interest and widespread use, since it provides a way to transmit data at relatively high rates in a given bandwidth and with maximum signal-to-noise performance. MSK modulation was first introduced and explained in U.S. Pat. No. 2,977,417 to M. L. Doelz, et al., assigned to the assignee hereof.

Briefly, an MSK modulated signal can be thought of as two combined orthogonal signals or channels plus or minus 90 degrees out of phase with each other, each of which is phase reversal keyed to represent alternate bits of a binary signal desired to be transmitted.

Each keyed pulse period, therefore, has a duration of two bit periods. These pulse periods are staggered in time by one bit period. After the two channels are phase shift keyed, they are each amplitude modulated with a one-half sinusoid, then combined by addition. Since the sine shaped envelopes of the two channels are 90 degrees out of phase with one another, the sum of the two channels results in a signal with constant envelope amplitude, which can be amplified, if desired, with, for example, a non-linear Class-C amplifier for transmission.

Various demodulation methods have been advanced for an MSK modulated signal. One method is to separate the incoming signal into two channels, which are each multiplied by a carrier having the same phase as each of the generator carriers. The plus and minus d-c signals are then multiplied by a sine shaped weighting signal, and the result applied to an integrator for the duration of the pulse period. The polarity of the integrator output determines whether the bit was a "1" or a "0". The demodulated bits from the two orthogonal channels are then interleaved to produce an output data bit stream. MSK modulated signals can also be detected by employing appropriately designed passive filters, as is known in the art.

One of the attributes of the above described MSK signal is that it has a particular frequency spectrum associated with it.

The average spectral density pattern of an MSK emission is shown in FIG. 1, representing a long term average, with random keying. (It is also the spectral density of a one-half sinusoid pulse and, additionally, this spectral density pattern represents the passband of an ideal matched-filter MSK detector.) The equation for this spectral density envelope pattern is:

$$G(f) = 20 \log \frac{4A}{\pi R} \left( \frac{\cos\left(\frac{2\pi f}{R}\right)}{\left(\frac{4f}{R}\right)^2 - 1} \right);$$

Where

A is the voltage amplitude of the MSK wave,
R is bits per second and,
f is the frequency separation from the carrier frequency.

The spectral density curves can be normalized by letting the amplitude by unity when $f = 0$ and scaling frequency as $f/R$.

An MSK wave is also identical to that of FSK with a modulation index of exactly 0.5. This means that the two FSK frequencies are separated by $R/2$ which places them plus and minus $R/4$ from the center, or carrier, frequency. The keying pattern is different, however, because with MSK the signal changes frequency when the next bit is the same as the previous bit. With FSK the upper frequency usually is designated to represent a "0" and the lower frequency a "1".

The MSK wave changes frequency instantly, but there is no break in phase continuity. Curve 20 of FIG. 2 illustrates MSK frequency changes for a given series of data bits, and is described below in detail.

The phase of the MSK wave (relative to the phase of the carrier) is illustrated by the dotted line 30 of FIG. 3 for the same bit pattern, also described below in detail. The phase changes 90 degrees during each period and the slope of the phase curve changes sign at the instant of a frequency change.

FIG. 4 shows a phasor diagram useful in analyzing an MSK wave. The phasor has a constant amplitude and rotates in phase, relative to carrier phase, by exactly plus or minus 90 degrees during each bit period. The i and q components of the phasor represent the amplitudes of each of the orthogonal channels.

Several investigators have described various means to bandlimit an MSK signal, usually with different objectives and self-imposed constraints. Early attempts to bandlimit very low frequency MSK emissions by employing bandlimiting filters in the low power exciter of a high power transmitter were only partially successful. Bandlimiting the MSK signal with conventional filters produces an amplitude ripple on the signal. Conventional Class C power amplifiers would remove the ripple by amplitude limiting the signal which partially restores the sidelobe emission. Band limiting filtering has been successfully employed at the output of low power microwave transmitters, however. For example, one invention is designed to achieve the maximum transmission bit rate within a given channel bandwidth as defined by the FCC. Filtering schemes as used in the prior art are not practical because of excessive size, weight, power loss and cost when used in the output of a high power transmitter. Furthermore, when filtering is done in the exciter or low power stages, the undesired emission is regenerated to an undesirable extent.

Another investigator adds certain levels of odd harmonic components to the sine-pulse shape of the orthogonal channels. This maintains a constant amplitude signal which can be amplified with a nonlinear RF amplifier without regenerating the sidelobes. This technique causes the sidelobes beyond plus and minus three bit rates from the carrier to fall off much faster, but it does not help at the plus and minus three bit rate frequency.

Often there is a need to receive a signal in the presence of a very strong signal on a nearby frequency channel. One particular need at VLF frequencies is the ability to receive a relatively narrow band signal located just beyond three times the data bit rate of the strong signal from the strong signal carrier frequency.

The spectral density of an unmodified MSK signal is down to about −40 dB at that location, but it would be very advantageous to reduce it to a level of −80 dB or lower.

BRIEF DESCRIPTION OF THE INVENTION

In light of the above, it is, therefore, an object of the invention to provide a method for generating an MSK detectable signal having constant envelope amplitude but greatly reduced side-lobe energy at and beyond 3 bit rates from carrier frequency.

This and other objects, features and advantages will become apparent to those skilled in the art from the following detailed description, when read in conjunction with the accompanying drawing and appended claims.

In accordance with the invention in its broad aspect, a method and apparatus are disclosed for generating an MSK detectable signal with reduced side-lobe energy of the type in which the MSK detectable signal has two combined orthogonal signals to transmit a data signal. In performing the method, a determination is made if a state change occurs in the data signal for each successive alternate data bits of said data signal for each channel, and an appropriate phase change is produced in each respective channel in accordance with said state change determination. Predetermined modulation envelope waveform patterns are then selected in accordance with said state change determination, and the respective orthogonal signals are amplitude modulated with the selected predetermined envelope waveforms, in accordance with said state change determination.

BRIEF DESCRIPTION OF THE DRAWINGS

The invention is illustrated in the accompanying drawing in which:

FIG. 1b is a comparison of one-half of the orthogonal signals of an ordinary and of a waveform-controlled MSK signal oriented along the 0–180 degree axis, in accordance with the invention, aligned with the complementary signal in FIG. 1a.

In the various figures of the drawing, like reference numerals are used to denote like items or parts.

DETAILED DESCRIPTION OF THE PREFERRED EMBODIMENTS

In accordance with the invention, a method and apparatus for generating a signal which can be detected by ordinary MSK techniques is presented. The signal is variously referred to herein as a modified waveform-controlled MSK signal or as an MSK detectable signal, meaning that it is detectable with a conventional MSK receiver, and has reduced sidelobe emission compared to that of a conventional MSK signal.

The means employed by the invention to reduce sidelobe emission is to smooth the transition from one frequency to the other without changing the signal amplitude. For example, the instantaneous frequency changes shown in FIG. 2 can be smoothed employing a cosine curve extending from the middle of one bit period to the middle of the next, such cosine curves being shown in FIG. 5. Correspondingly, the sharp direction changes in phase become sinusoidally shaped, as shown in FIG. 3. The phasor shown in FIG. 4 no longer traverses plus and minus 90 degrees every bit period. When the next bit causes a reversal in phasor rotation, the phasor slows down and reverses 16.4 degrees before reaching one of the orthogonal axes (or one of the carrier phases).

Figure 4:
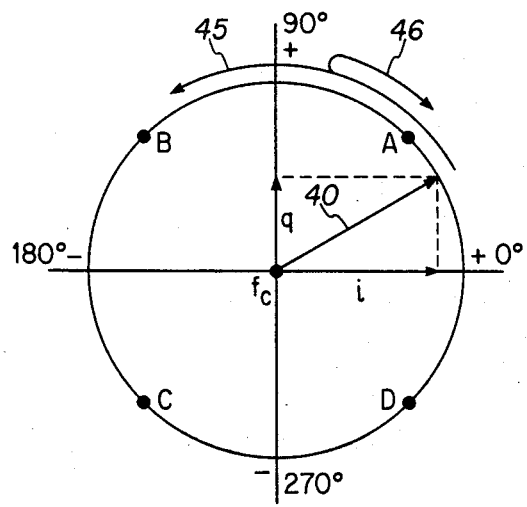
FIG. 4 is a circular phasor diagram showing the phase rotation for a waveform-controlled MSK signal, in accordance with the invention.

In the above case, the phasor will be passing through one of the points A, B, C, or D in FIG. 4 in the middle of each bit period. It will be traveling at maximum velocity at these points which correspond to the maximum frequency excursions, shown in FIG. 2.

It can be readily observed that when the bit data stream causes a frequency change every bit period, the resulting signal is identical to sine-wave, phase-modulation, with a low modulation index. The higher order modulation products drop in amplitude very fast, with increasing order, which leads to the benefit of the present invention.

As will become apparent, other curve shapes can be employed for the phase transition. An exponential phase transition gives slightly better performance than the sine transition, but may be more difficult to generate; consequently, the means to generate the sine shaped phase transition will be described.

Figure 5:
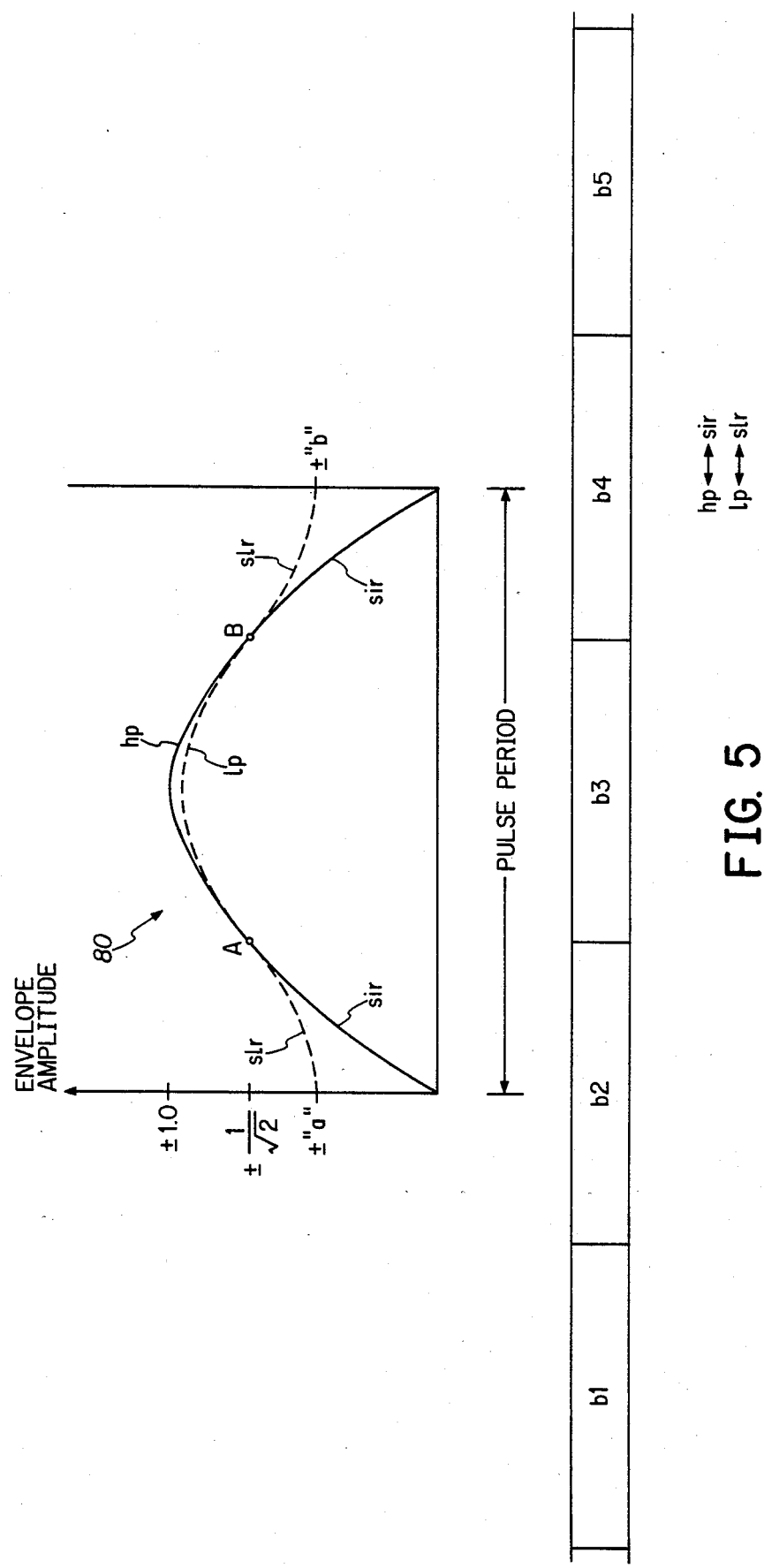
FIG. 5 is a graph showing the various pulse envelope waveforms, illustrating a complete set of such waveforms for amplitude modulating the channels to achieve a waveform-controlled MSK signal, in accordance with the invention.

In accordance with the present invention, the desired phase modulation waveform is generated by modifying the amplitude modulation on each pulse period (2 bits duration) on each of the orthogonal channels. The pulse envelope may have any one of eight shapes depending upon the pattern of successive bits. The pulse envelope consists of three parts, as shown in FIG. 5. The information transmitted by this pulse is b3. Bits b1, b3, b5, etc., are carried in the orthogonal channel being described, while bits b2, b4, etc., are carried in the other orthogonal channel.

The curves which may be generated are shown in FIG. 5. When b3 is the opposite of b1, the pulse starts at zero amplitude and the phase of the carrier wave modulated by this envelope reverses. This phase reversal may be achieved either by reversing the phase of the carrier at that instant or by reversing the polarity of the envelope modulation. When b3 is the same as b1, the envelope starts at "a". The decision of which curve to follow had to be made at point B of the previous pulse in the same channel.

Bits b2 and b4 determine which curve is to be followed from A to B. If they are different, the upper curve is followed and when they are the same the lower curve is followed.

Bits b3 and b5 determine which curve is to be followed during the last quarter of the pulse (and the first quarter of the next). When b5 is the same as b1 the curve going to "b" is selected; if they are opposite the curve going to zero is selected.

The pulse envelope in the orthogonal channel is determined in the same manner, but it is offset in time by one bit period. The quadrature addition of the orthogonal channel envelopes at any instant in time is a constant value. Therefore, the objective of generating a constant amplitude signal with greatly reduced higher order modulation products has been achieved.

Figure 1:
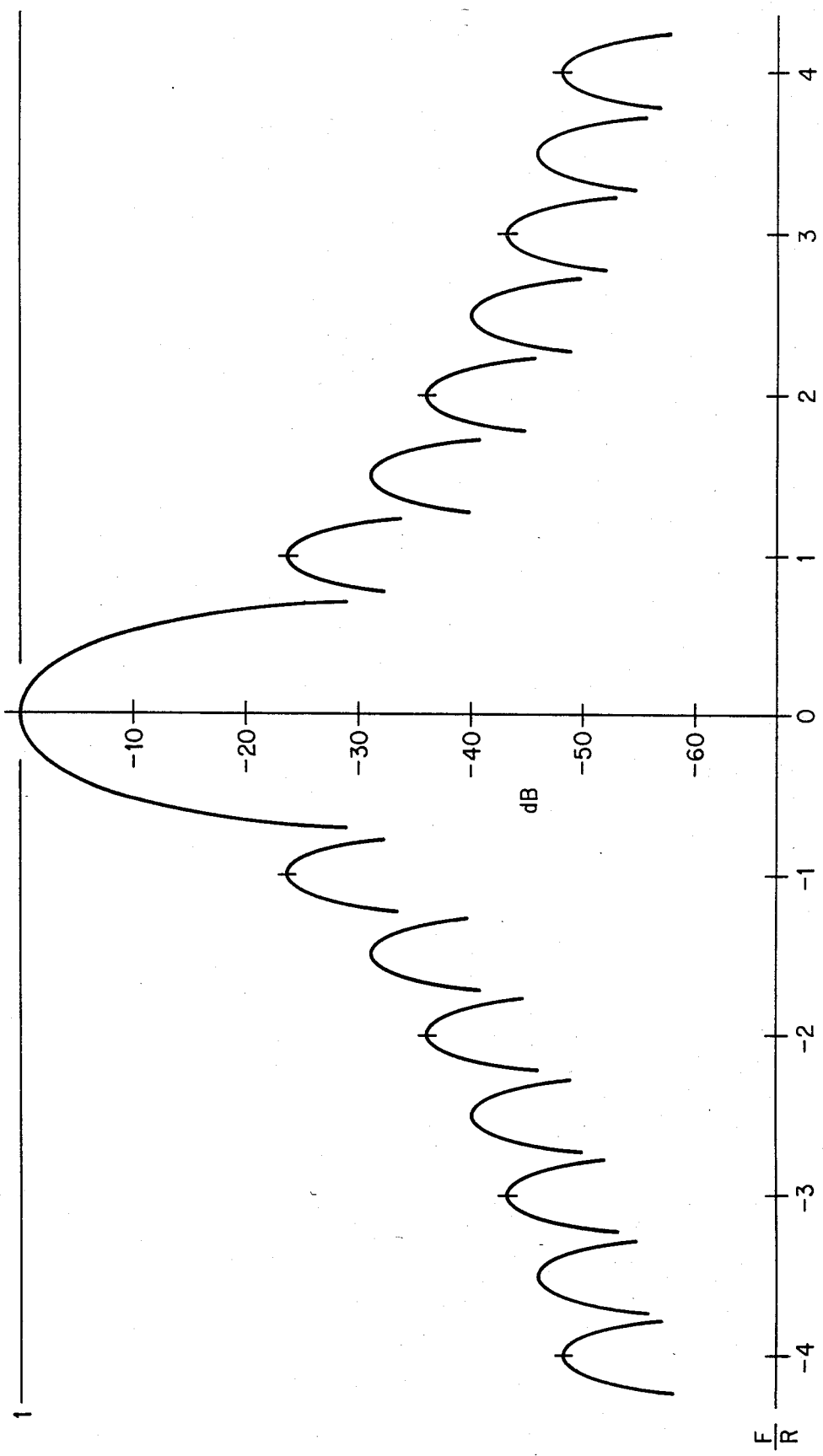
FIG. 1 is a graph of average spectral density of an MSK emission.
Figure 1A:
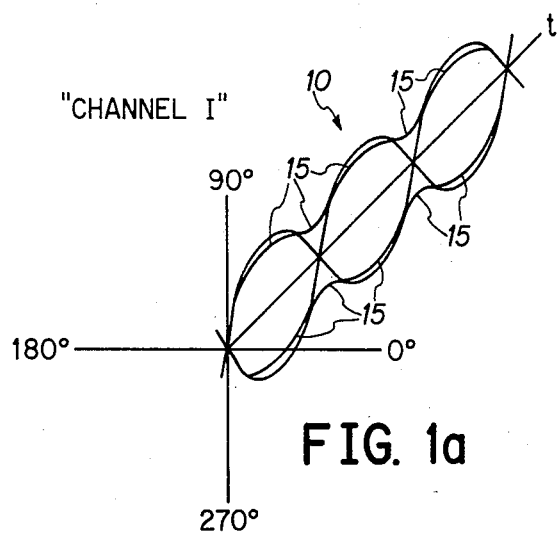
FIG. 1a is a comparison of one-half of the orthogonal signals of an ordinary and of a waveform-controlled MSK signal oriented along the 90–270 degree axis, in accordance with the invention.
Figure 1B:
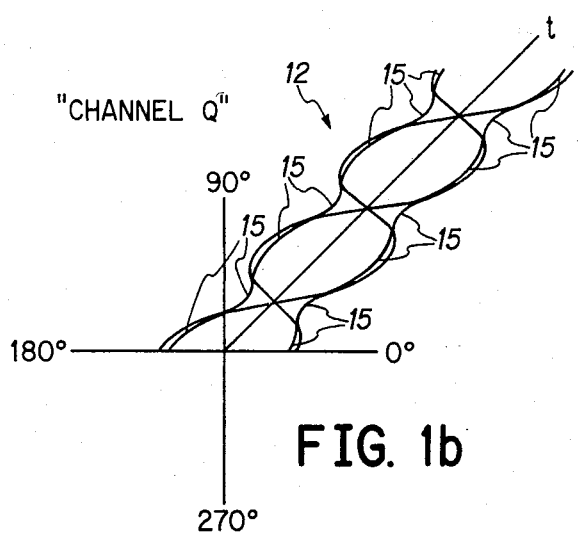

As shown in FIG. 1, one way to analyze an MSK signal is to consider the composite signal as being formed from two components, one a PSK signal 10 generated along the phase line 90–270 degrees (FIG. 1a), and the other a PSK signal 12 generated along the phase line 0–180 degrees (FIG. 1b). Each of the signals is amplitude modulated with a sinusoidal envelope, so that, each signal appears as a series of end to end "footballs".

Figure 2:
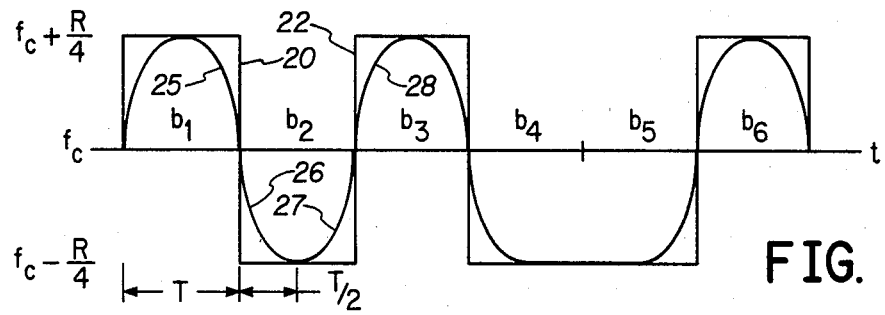
FIG. 2 is a graph comparing six bits of ordinary MSK frequency change with waveform-controlled MSK frequency change, in accordance with the invention, representing a binary signal to be transmitted.
Figure 3:
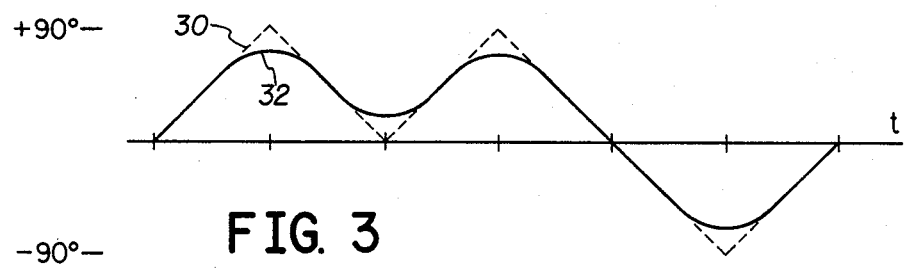
FIG. 3 is a graph comparing the phase changes in an ordinary MSK signal with the phase changes in a waveform-controlled MSK signal produced by the signal represented in FIG. 2.

A graph of the frequency changes in an MSK signal (representing, for instance a digital signal 110000 or 000011, or the like, depending on the history of the signal) is shown in FIG. 2. As mentioned, successive alternate bits are directed to one of the respective two channels. Thus, for example, bits 1,3 and 5 may be directed to one channel, and bits 2,4 and 6 may be directed to the other channel. Ordinary MSK signals have an instantaneous frequency change upon transitions, such as the transition 20 between bits numbers one and two, or transition 22 between bits numbers two and three. I have discovered that by making the transitions gradual, as shown, for instance by lines 25 and 26 between bits one and two and by lines 27 and 28 between bits two and three, the spectral density of the signal is greatly reduced. The manner by which this gradual transition between frequencies is achieved is by amplitude modulating the respective channels with waveform segments in the manner described above.

When the frequency is gradually changed, as immediately above described, the phase changes in the MSK signal also have gradual or smoothed changes rather than instantaneous changes in directions, as shown in FIG. 3, a graph of phase change vs. time. Ordinarily, the phase changes corresponding to the signal of FIG. 2 would correspond to the dotted line triangularly shaped waveform 30 shown, with sharp transisitions corresponding to the instantaneous frequency transitions of the FIG. 2 waveform. With the gradual changes in frequency, the phase changes also naturally follow the curved line portions 32, as shown.

The consequences of the phase changes in accordance with the invention are explained with reference to the phasor diagram of an MSK signal shown in FIG. 4. The phasor phase is referenced to the phase of the carrier of the I channel which is on center frequency. Changes in the phase of the MSK signal result in corresponding changes in the direction of rotation of the phasor 40. The two channels of the MSK signal are designated "I" and "Q" for convenience, and the directions 0–180 and 90–270 represent the directions of the orthogonal signals of the I and Q channel, respectively, similar to the signal shown in FIGS. 1a and 1b. In the phasor diagram of FIG. 4, the letters "i" and "q" represent the components of the respective I and Q channel modulation.

Considering the location of the phasor 40 at the middle or center of each pulse period (i.e. T/2), the phasor will be at one of the points A, B, C or D, and will be in continuous movement. The phasor 40 will be moving away from the I channel phase (horizontal) after the middle of the I channel bit period, and, likewise, will be moving away from the Q channel phase (vertical) after the middle of the Q channel bit period.

More specifically, assuming that the previous bit was a 1 in the I channel and the phasor 40 is at A and moving counterclockwise, and assuming that the next bit in the Q channel is also a 1, (the location and direction of the phasor is determined by the history of the data, as will become apparent), the phasor must then follow either of two paths, toward B or toward D, depending upon the next subsequent bit in the I channel. If the next subsequent bit in the I channel is a 0, the phasor will continue to rotate at the same velocity toward B, as shown by arrow 45, and it will point to B in the middle of the bit period of the Q channel bit. The polarity of the I channel will, of course, change from positive to negative as the phasor passes through the vertical axis. On the other hand, if the next subsequent bit in the I channel is a 1, the phasor will slow down in anticipation of changing direction, then reverse directions, speed up and return to A at the middle of the bit period, as shown by arrow 46, without ever having reached the vertical axis at +90 degrees.

If the next bit to be transmitted is a 1 in the I channel the phasor must be either at A moving clockwise or at D moving counterclockwise. (It would be at A if the previous bit in the Q channel were a 1, and at D if the bit were a 0, as explained above.) It can be seen, therefore, that to achieve this phasor action, the state of the next bit must be anticipated, so that the phasor will be at either A or D for the immediately upcomming 1 in the I channel, and so forth.

In a preferred embodiment, the gradual frequency and phase change described above is achieved by controlling the amplitude modulation envelope shape of the signal in each channel, depending upon the desired bit pattern to be transmitted. To achieve the desired envelope, four waveform segments are provided, as shown in FIG. 5. The particular envelope waveforms shown correspond functionally approximately to a half-sine wave, and are selected in pairs so that when the pairs are added, the sum will be constant. It should be noted that other waveforms can be equally advantageously employed, such as a set which produces exponential rounding in the phase domain.

The four segments are designated and have the following equations:

hp—high peak—$2 \sin \theta$ sir—sign reversal—$2 \sin \theta$ lp—low peak—$2 \sin 45 (1 - (2/\pi) \cos 2\theta)$ slr—slope reversal—$2 \sin 45 (1 - 2/\pi \cos 2\theta$.

It should be noted that the waveforms shown are illustrated as positive waveforms, but the negative values of the waveforms are used as well, as will become apparent.

As mentioned, the wave shapes are paired; that is, the lp and slr waves are paired together and the hp and sir waves are paired together. Also, the wave shapes are configured so that the amplitudes of both I and Q channel signals are plus or minus the square root of 2 at the middle of the bit period. The selection of the pairs of waveforms then is as follows. If the first bit, for example, in the I channel is a 1, then the slr wave is selected to shape the last half of the preceeding bit period and the lp wave is selected for the beginning of the next bit period. If the first I bit is a 0, then the sir wave is selected for the end of the preceeding bit period and the hp wave is selected for the beginning of the next. Thus, at the middle of each bit period, the am envelopes must continue in either of two patterns, either the slr waveshape or the sir waveshape.

It should be noted that since the last quarter of the preceeding bit period must be shaped, the next bit must be anticipated prior to transmission. This requires three bits to be used in the waveform selection for any particular bit, the preceeding, the middle and the succeeding bits.

Figure 7:
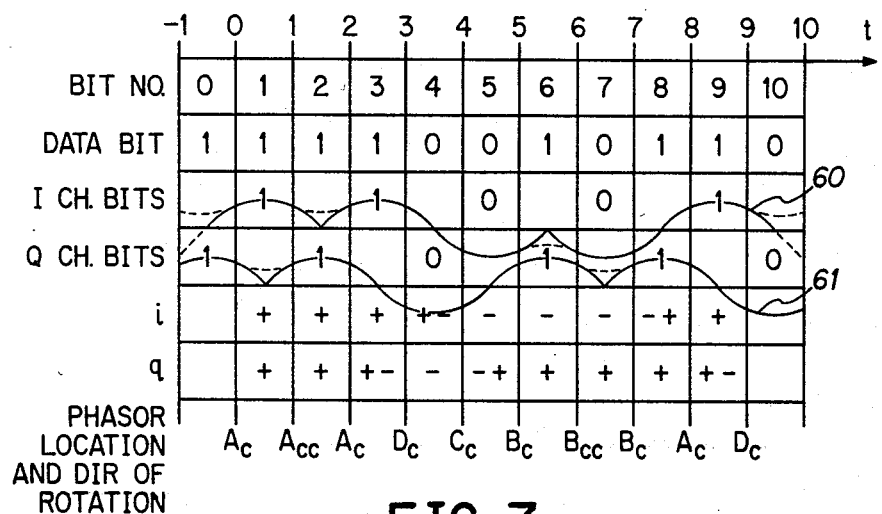
FIG. 7 is a table showing the location and direction of rotation of the phase vector of FIG. 4 for various input data, in accordance with the invention.

Reference is again made to the phasor diagram of FIG. 4, and reference is made to the table in FIG. 7 for further illustration of the waveform selection. It is assumed, for illustration, that a bit sequence of 11110010110 is desired to be transmitted. The bits are alternately assigned to the I and Q channels, as shown in the table of FIG. 7. The corresponding phase of the i and q modulation envelopes is then shown for each bit period (some reversing in the middle of the bit period). Finally, the location of the phasor 40 is shown at the beginning of the bit period, with the subscript indicating clockwise (c) or counterclockwise (cc) rotation. In the table of FIG. 7, it is assumed that the phasor 40 was initially rotating clockwise. It can be seen that when a 1 is being transmitted in the I channel, the sign of i is positive, and when a 0 is being transmitted, the sign of i is negative. Likewise, when a 1 is being transmitted in the Q channel, the sign of q is positive, and when a 0 is being transmitted, the sign of q is negative. The curves 60 and 61 represent the phase of the respective I and Q channel signals, and are shown in alignment with the respective channel data, to aid in understanding this concept.

It should be also noted that polarity reversals occur only when the particular bit being transmitted is in the other channel. Thus, for instance, when bit number 3 is being transmitted in the I channel, the sign of the q channel changes from positive to negative because the previous bit in the Q channel was a 1 and the next bit in the Q channel is a 0. When the previous and next bits in a particular channel are the same, the polarity does not change and is positive for 1's and negative for 0's. Thus, as mentioned above, three successive bits are required to determine which of the modulation envelope wave segments are selected during any given bit period.

Figure 6:
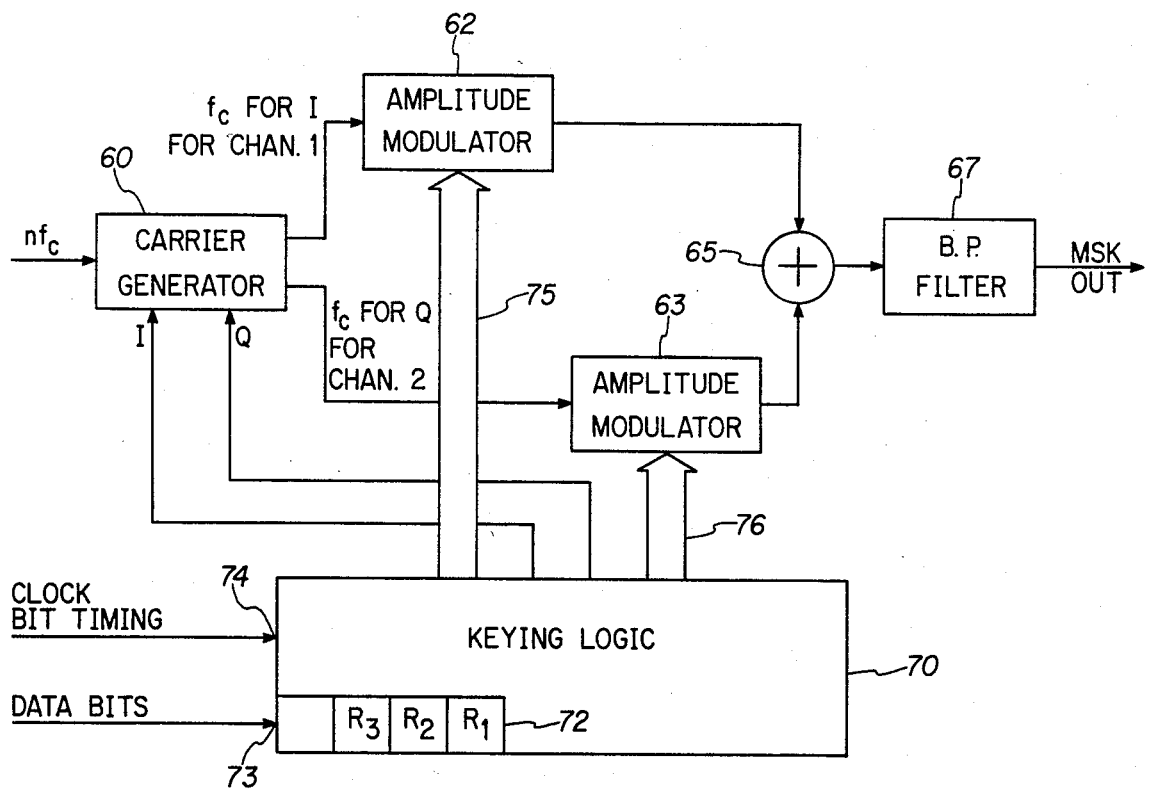
FIG. 6 is a block diagram of one circuit for generating a waveform-controlled MSK signal, in accordance with the invention.

The "waveform-controlled" MSK signal generated as that described above can be generated with a circuit such as described with reference to the block diagram of FIG. 6. As shown, a carrier generator 60 has as an input signal representing the center frequency of the orthogonal signals desired, or some multiple thereof. The circuitry to produce two quadrature phased outputs at carrier frequency is well known in the art and is not described herein in detail. The center frequency outputs of the carrier generator 60 are applied to respective amplitude modulators 62 and 63, for example for the I and Q channels. The outputs of the modulators 62 and 63 are added together by adder 65 to form the composite MSK signal. If desired, the composite signal at the output of the adder 65 can be passed through an optional bandpass filter 67, as shown. The output of the adder 65 or of the bandpass filter 67 represents the "waveform-controlled" MSK signal of the invention.

It should be noted that the method for controlling the phase changes of the carrier can be accomplished by other circuits than the circuit illustrated. For example, the outputs 75 and 76 can be constructed to change the sign of the envelope of the output of the respective amplitude modulators 62 and 63 (not shown). Other ways of achieving the phase modulation will also be apparent to those skilled in the art.

The data to be transmitted are applied to an input 73 of a keying logic circuit 70, and shifted, for example, through a shift register 72 to enable three successive data bits to be examined for determining the particular waveform for modulating the respective channel signals. The data bit in the middle of the shift register 72 is the data bit being transmitted at any instant. The other two bits control the selection of wave shapes so that the modulator output conditions will be right for transmission of the next bit in the fashion described in detail above. The clocking rate of the data into the keying logic circuit 70 is controled by a bit timing clock signal applied to another input 74.

The keying logic circuit 70 has output signals 75 and 76 applied to the amplitude modulators 62 and 63 to cause the predetermined waveforms to be followed by the amplitude modulation patterns of the rspective I and Q signals. In addition, the keying logic circuit 70 has two outputs to the carrier generator 60 for controlling the phase reversal of the respective I and Q channels, in the same manner as conventional MSK modulation techniques.

The particular waveforms to be applied to the amplitude modulators 62 and 63 are conveniently stored as digital samples in a ROM (not shown). The digital information thus read out is then applied to a digital-to-analog converter (not shown) to control the modulation of the amplitude modulators 62 and 63.

Figure 8:
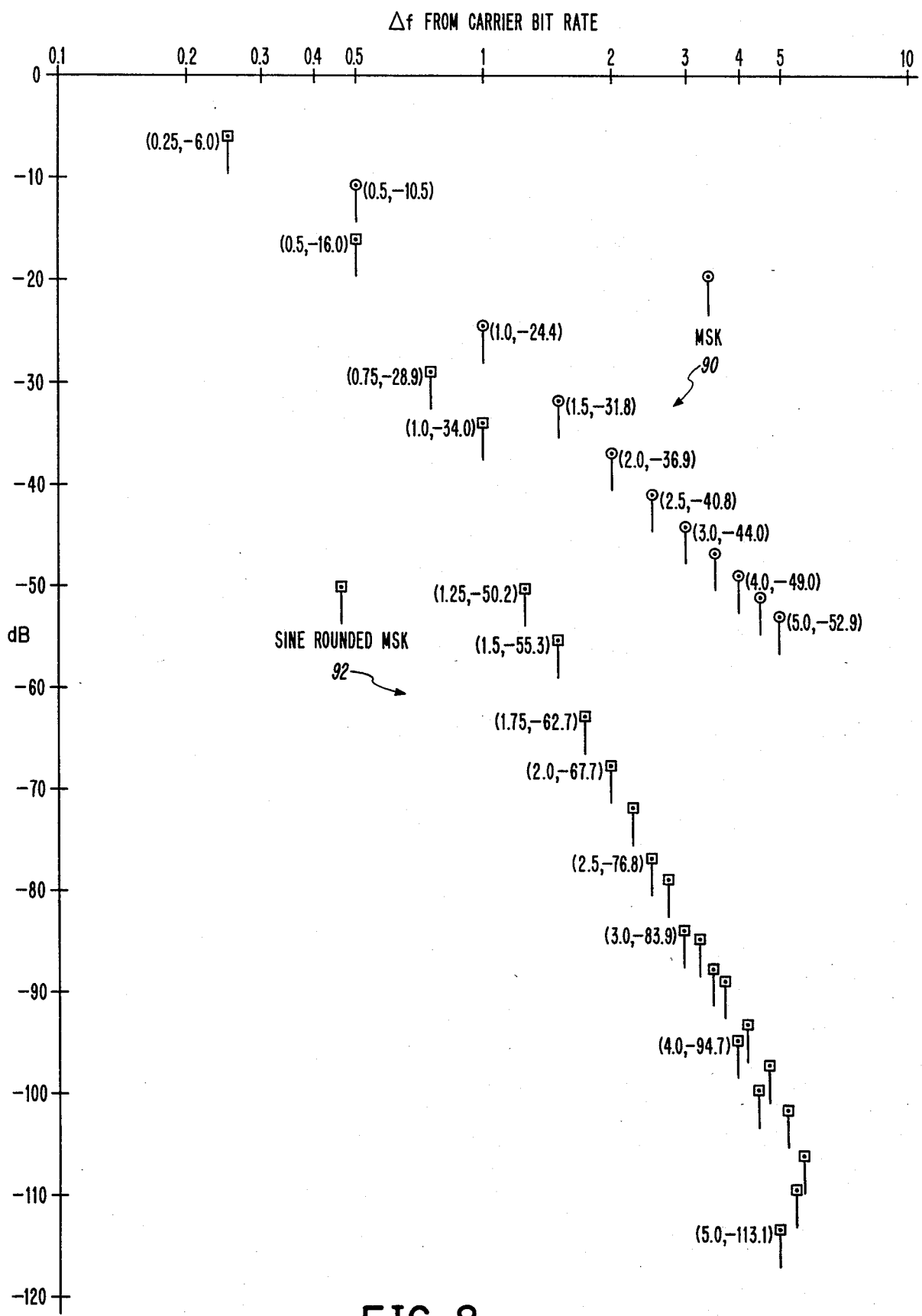
FIG. 8 is a graph comparing the side-lobe energies of an ordinary MSK signal and a sinusoidally shaped waveform-controlled MSK signal, in accordance with the invention.

As mentioned above, the waveform-controlled MSK signal has significantly reduced side-lobe energy. A computer simulation comparing the side-lobe energies of an ordinarily produced MSK signal and a waveform-controlled MSK signal using sinusoidal waveform segments of FIG. 5 and in accordance with the invention, was performed, and the data developed are set forth in Table 1 below, and representative data are graphed in FIG. 8. In FIG. 8, the abscissa represents the quotient of the frequency change from the carrier and the bit rate, and the ordinate represents the decibel side-lobe intensity. The MSK data bit pattern chosen for the data set forth in Table 1 and FIG. 8 was a repeating 1010 pattern. The waveform-controlled MSK data repeating bit pattern chosen is a 1001 pattern, since the 1001 bit pattern represents the worst case. (Ideally, a random bit pattern would produce less side-lobe energy than shown.) The curve 90 is that obtained by ordinary MSK modulation, and the curve 92 is that obtained by the waveform-controlled MSK modulation above described. As can be seen, the waveform-controlled MSK signal falls to about −84 db at a frequency to bit ratio of 3 whereas the ordinary MSK signal falls only to −44 db.

TABLE 1
Level of Spectral Lines for Repeating
1010 Bit Pattern for Ordinary MSK and
Waveform Controlled (Sine Rounded) MSK
and for Repeating 1001 Bit Pattern for
Waveform Controlled (Sine Rounded) MSK

| Sideband Pair Number | ±Δ f/R | Ordinary MSK 1010 | Sine Rounded MSK 1010 | ±Δ f/R | Sine Rounded MSK 1001 |
|---|---|---|---|---|---|
| 1  | ½  | −10.5 | −12.3  | ¼  | −6.0 |
| 2  | 1  | −24.4 | −30.3  | ½  | −16.0 |
| 3  | 1½ | −31.8 | −51.8  | ¾  | −28.9 |
| 4  | 2  | −36.9 | −75.9  | 1  | −34.0 |
| 5  | 2½ | −40.8 | −101.9 | 1¼ | −50.2 |
| 6  | 3  | −44.0 | −129.5 | 3/2 | −55.3 |
| 7  | 3½ | −46.7 |        | 1¾ | −62.7 |
| 8  | 4  | −49.0 |        | 2  | −67.7 |
| 9  | 4½ | −51.1 |        | 2¼ | −71.7 |
| 10 | 5  | −52.9 |        | 2½ | −76.8 |
| 11 | 5½ | −54.6 |        | 2¾ | −78.8 |
| 12 | 6  | −56.1 |        | 3  | −83.9 |
| 13 | 6½ | −57.5 |        | 3¼ | −84.7 |

Although the invention has been described and illustrated with a certain degree of particularity, it is understood that the present disclosure has been made by way of example only and that numerous changes in the combination or arrangement of parts may be resorted to by those skilled in the art without departing from the spirit and scope of the invention as hereinafter claimed.

I claim:

1. Means for generating an MSK detectable signal for transmission of a binary data signal having a sequence of mark and space data bits comprising:

a waveform generator for phase controlling a pair of orthogonally oriented waves in accordance with respective successive alternate data bits of said data signal and for amplitude modulating each of said orthogonally oriented waves with a waveform pair so that said modulated orthogonally oriented waves have continuously rounded phase transitions;

said waveform pair being selected in accordance with the states of three successive bits of said data signal according to the following table:

| next bit | present bit | previous bit | waveform pair |
|---|---|---|---|
| 0 | 0 | 0 | lp-slr |
| 0 | 0 | 1 | slr-hp |
| 0 | 1 | 0 | lp-slr |
| 0 | 1 | 1 | slr-hp |
| 1 | 0 | 0 | slr-hp |
| 1 | 0 | 1 | lp-slr |
| 1 | 1 | 0 | slr-hp |
| 1 | 1 | 1 | lp-slr | wherein lp is a low-peak wave having a shape defined by $2 \sin 45 (1-(2/\pi) \cos 2\theta)$;

hp is a high-peak wave having a shape defined by $2 \sin \theta$;

slr is a slope reversing wave having a shape defined by $2 \sin 45 (1-(2/\pi) \cos 2\theta)$;

slr is a sign reversing wave having a shape defined by $2 \sin \theta$;

and means for combining said amplitude modulated signals into a combined signal to form said MSK detectable signal.

2. The means for generating an MSK detectable signal of claim 1 further comprising a band pass filter through which said combined signal is passed to produce said MSK detectable signal.

3. The means for generating an MSK detectable signal of claim 1 wherein the MSK detectable signal is of constant envelope amplitude.

* * * * *

UNITED STATES PATENT AND TRADEMARK OFFICE
CERTIFICATE OF CORRECTION

PATENT NO. : 4,516,087
DATED : May 7, 1985
INVENTOR(S) : Warren B. Bruene

It is certified that error appears in the above-identified patent and that said Letters Patent are hereby corrected as shown below:

Column 6, line 66, delete "$2/\pi \cos 2\theta$" and substitute therefor --$(2/\pi) \cos 2\theta$)-

Column 10, line 13, delete "slr-hp" and substitute therefor --sir-hp--;
line 15, delete "slr-hp" and substitute therefor --sir-hp--;
line 16, delete "slr-hp" and substitute therefor --sir-hp--;
line 18, delete "slr-hp" and substitute therefor --sir-hp--;
line 26, delete "slr" and substitute therefor --sir--.

Signed and Sealed this

First Day of October 1985

[SEAL]

Attest:

DONALD J. QUIGG

Attesting Officer

Commissioner of Patents and
Trademarks—Designate